United States Patent
Campbell et al.

(10) Patent No.: US 9,699,862 B2
(45) Date of Patent: Jul. 4, 2017

(54) POWER LINE NON-LIGHTING APPLICATION CONTROLLER SYSTEM AND METHOD

(71) Applicant: Lumenpulse Lighting Inc., Montreal (CA)

(72) Inventors: Gregory Campbell, Walpole, MA (US); Yvan Hamel, Laval (CA); Philippe Racine, Saint-Basile-le-Grand (CA); Francois-Xavier Souvay, Montreal (CA); Jesse Lilley, Montreal (CA)

(73) Assignee: Lumenpulse Lighting, Inc. (CA)

( * ) Notice: Subject to any disclaimer, the term of this patent is extended or adjusted under 35 U.S.C. 154(b) by 476 days.

(21) Appl. No.: 13/887,551

(22) Filed: May 6, 2013

(65) Prior Publication Data

US 2013/0293155 A1 Nov. 7, 2013

Related U.S. Application Data

(60) Provisional application No. 61/643,632, filed on May 7, 2012.

(51) Int. Cl.
*H05B 37/02* (2006.01)
*H04L 12/28* (2006.01)

(52) U.S. Cl.
CPC ........... *H05B 37/02* (2013.01); *H04L 12/282* (2013.01); *H04L 12/2818* (2013.01);
(Continued)

(58) Field of Classification Search
CPC ............... H05B 37/02; H05B 37/0263; H04B 2203/5408; H04B 2203/5458; H04L 12/2818; H04L 12/282; H04L 2012/285
See application file for complete search history.

(56) References Cited

U.S. PATENT DOCUMENTS 5,980,057 A * 11/1999 Christie ..................... 362/86
6,292,901 B1 9/2001 Lys et al.
(Continued)

FOREIGN PATENT DOCUMENTS

FR 2973622 A1 10/2012
KR 20090022573 A 3/2009
WO 2009014880 A2 1/2009

*Primary Examiner* — Patrick O'Neill
(74) *Attorney, Agent, or Firm* — Burns & Levinson LLP; Joseph M. Maraia (57) ABSTRACT

In some examples, non-lighting application controller technology includes methods and apparatuses. In other examples, the technology includes a non-lighting application controller system. The system includes one or more light fixtures. Each light fixture of the one or more light fixtures has one or more non-lighting elements, such as a speaker, alarm, motor, and camera. Each light fixture of the one or more light fixtures is electrically coupled via a power line. Each light fixture of the one or more light fixtures includes a conversion module configured to convert instructions between power line communication and non-lighting control communication, a communication module configured to communicate the power line communication over the power line, and a non-lighting element controller configured to control the one or more non-lighting elements in a respective light fixture based on the instructions.

17 Claims, 7 Drawing Sheets

(52) U.S. Cl.
CPC . *H05B 37/0263* (2013.01); *H04B 2203/5408* (2013.01); *H04B 2203/5458* (2013.01); *H04L 2012/285* (2013.01)

(56) References Cited

U.S. PATENT DOCUMENTS

| | | |
|---|---|---|
| 6,331,756 B1 | 12/2001 | Belliveau |
| 6,930,455 B2 | 8/2005 | Chansky et al. |
| 6,969,954 B2 | 11/2005 | Lys |
| 7,455,435 B2* | 11/2008 | Mathews et al. ............. 362/441 |
| 7,535,341 B2* | 5/2009 | Haase ........................... 340/326 |
| 7,550,931 B2 | 6/2009 | Lys et al. |
| 7,676,300 B2 | 3/2010 | Kim et al. |
| 7,777,427 B2 | 8/2010 | Stalker, III |
| 7,961,113 B2 | 6/2011 | Rabiner et al. |
| 7,984,135 B2 | 7/2011 | Kaneko et al. |
| 8,299,903 B2* | 10/2012 | Haase et al. .................. 340/326 |
| 8,319,452 B1 | 11/2012 | Hamel et al. |
| 8,422,889 B2* | 4/2013 | Jonsson ........................ 398/172 |
| 8,768,493 B2* | 7/2014 | Souvay et al. ................. 700/83 |
| 2002/0181497 A1 | 12/2002 | Mano et al. |
| 2003/0197807 A1* | 10/2003 | Wu ................................ 348/375 |
| 2003/0210340 A1 | 11/2003 | Romanowich |
| 2004/0225811 A1 | 11/2004 | Fosler |
| 2005/0275626 A1 | 12/2005 | Mueller et al. |
| 2006/0033454 A1 | 2/2006 | Mathews et al. |
| 2009/0028372 A1* | 1/2009 | Cerasuolo .................... 381/387 |
| 2009/0066266 A1 | 3/2009 | Jungwirth et al. |
| 2009/0096993 A1 | 4/2009 | Velazquez |
| 2010/0111538 A1 | 5/2010 | Arita et al. |
| 2011/0140611 A1 | 6/2011 | Elek et al. |
| 2011/0178650 A1 | 7/2011 | Picco |

* cited by examiner

POWER LINE NON-LIGHTING APPLICATION CONTROLLER SYSTEM AND METHOD

RELATED APPLICATIONS

The present application claims priority to U.S. Provisional Patent Application No. 61/643,632, filed May 7, 2012, the entire contents of which is incorporated in its entirety herein by reference.

BACKGROUND

Adding non-lighting elements to a space, such as speakers, alarms, motorized light fixtures and cameras, typically require adding wires to control these elements. In old or existing construction, adding non-lighting control capabilities usually involves "fishing" control wires behind finished ceilings, walls, and/or floors, which is time-consuming, labor-intensive, and expensive. While not as expensive as retrofitting existing construction, in new construction there is still the material cost of the control wires, which can be expensive itself. Thus, a need exists in the art for power line non-lighting application controller processes and apparatuses with the features as described herein.

SUMMARY

As a general overview of power line non-lighting application controller processes and apparatuses (hereinafter referred to as "technology"), the technology includes a master controller that communicates with one or more individually controllable non-lighting elements in light fixtures, such as speakers, alarms, motors, and cameras, via power line communication over a power line utilizing non-lighting control communication (e.g., speaker control communication, alarm control communication, motor control communication, and camera control communication). The master controller can convert non-lighting control communication to power line communication for transmission over a power line to the non-lighting elements in the light fixtures and/or the non-lighting elements can convert the power line communication to non-lighting control communication for control of the individual non-lighting elements. For example, a master controller (e.g., mobile phone, personal computing device) transmits a power line communication including an instruction to, for example, ring a class bell, sound a fire alarm, rotate a light fixture or start recording video. The non-lighting element receives the power line communication and responds to the instruction by, for example, ringing the class bell, sounding the fire alarm, rotating the light fixture or start recording video. In this regard, the master controller can advantageously enable the conversion of non-lighting control communication (in this example, an inherently robust protocol with a high bandwidth capacity with quality control features) to power line communication (in this example, an inherently slow protocol with a low bandwidth capacity with limited quality control features), thereby increasing the available uses for light fixtures to also include non-lighting applications and decreasing the installation time of wiring infrastructure needed for the non-lighting applications.

In some examples, the technology adds an audio capability to a light fixture that normally exists over a traditional public announcement (PA) system that is dedicatedly wired or "hard-wired." Examples include class bells, emergency sirens, fire alarms, and other simple audio communication (announcements). In other examples, the technology may be implemented by a system that includes an audio amplifier embedded into or communicatively coupled to a light fixture. With respect to new construction, examples of the technology advantageously simulate an existing infrastructure and provide the similar functionality within a space without the need for new and/or dedicated data (control) wiring.

As is typical with alarms (or sirens) in commercial settings, such as a fire alarm, a light source is used to communicate a visual siren for the hearing impaired. A light source may also be used when an audio siren or audio aspect of an alarm (siren) is disabled (e.g., silent alarm). In some examples, the technology controls a light source pre-existing in a space, such as room lights, to blink at a fast interval, for example, to notify or alert inhabitants, visually, of an alarm condition or emergency situation. The technology may also control the duration and/or periodicity of the visual siren being provided by the light source. In this regard, the technology advantageously adds an alarm (or siren) capability to a new or pre-existing fixture without requiring an extra (additional) emergency light source in a space.

In some examples, the technology adds a motor control capability to a light fixture. Examples include rotating a fixture (e.g., to a set location), focusing light in a particular direction, and moving a fixture, to name a few. In other examples, the technology controls a motor in a light fixture in real time, near-real time or according to a pre-programmed sequence or "script." As an example, the technology controls motorized light fixtures in a ballroom for an event, such as a wedding. The technology rotates and "pinpoints" light fixtures corresponding to particular aspects of a given event (e.g., light focusing on centerpieces, dance floors, or accent lighting) as the floor plan changes depending on layout custom to each event. In this regard, the technology is advantageous in environments subject to variability and change, such as museums, atriums, ballrooms, conference centers, and exhibit halls, to name a few.

In other examples, the technology adds camera control capability to a light fixture, such as pan, tilt, zoom in, zoom out, start recording, and stop recording. In some examples, the technology notifies or alerts a user that video recorded by a camera in a light fixture is ready to be downloaded from the camera (or associated storage device) by way of a communication or message sent over the power line. In still other examples, the technology downloads the recorded video from the camera to a storage device.

One approach to a non-lighting application controller is a method that controls a non-lighting element in a light fixture, such as a speaker, alarm, motor, and camera. The method includes receiving a non-lighting control communication, the non-lighting control communication comprises one or more instructions associated with a non-lighting element; converting the non-lighting control communication to a power line communication; and transmitting the power line communication to the non-lighting element via the power line.

Another approach to a non-lighting application controller is a protocol conversion device that can control a non-lighting element in a light fixture, such as a speaker, alarm, motor, and camera. The protocol conversion device includes a communication module configured to receive a non-lighting control communication, the non-lighting control communication includes one or more instructions to control a non-lighting element in a light fixture; a protocol conversion module configured to convert the non-lighting control communication to a power line communication; and a power line transmitter configured to transmit the power line communication via the power line. In some examples, the instructions include status monitoring information, energy management information, or any combination thereof In a "plug-in" approach to a non-lighting application controller, a non-lighting element, such as a speaker, alarm, motor, or camera, is packaged into a module configured to plug or screw into a socket in a light fixture normally occupied by an light emitting diode (LED). The plug-in module includes conversion and communication modules to control the packaged non-lighting element according to the examples described herein. In other examples, the plug-in module includes an LED with the non-lighting element. Example combinations include speaker and LED, and camera LED. With the "plug-in" approach, non-lighting capabilities can be added to a light fixture by simply plugging or screwing in the plug-in module into the light fixture. In this regard, the technology may be advantageously used to add non-lighting capabilities to light fixtures made by manufacturers different from the one making the plug-in module and also made by different manufacturers. Additionally, the technology is appealing to those different manufacturers because the technology can be advantageously used without the need to redesign or reengineer, in order to enhance their light fixtures with non-lighting capabilities.

In other examples, the master controller also communicates with one or more individually controllable lights in the light fixtures via the power line communication over the power line utilizing a lighting control communication, such as remote device management (RDM), digital multiplex with 512 pieces of information (DMX512), Digital Addressable Lighting Interface (DALI), and ZigBee® standards. The master controller can convert lighting control communication to power line communication for transmission over the power line to the lights and/or the lights can convert the power line communication to lighting control communication for control of the individual lights.

For example, the master controller (e.g., mobile phone, personal computing device) transmits a power line communication including a light instruction to change a color temperature for the lights. The power line communication can include the individual addresses for the lights to direct the power line communication to the correct lights. The lights receive the power line communication and respond to the light instruction to change the color temperature of the lights. In this regard, the master controller can advantageously enable the conversion of lighting control communication, such as RDM, DMX512, DALI, and ZigBee standards (in this example, an inherently robust protocol with a high bandwidth capacity with quality control features) to power line communication (in this example, an inherently slow protocol with a low bandwidth capacity with limited quality control features), thereby increasing the available uses for light fixtures and decreasing the installation time for light systems.

The power line non-lighting application controller systems and methods described herein (hereinafter "technology") can provide one or more of the following advantages. An advantage of the technology is that the use of a protocol conversion device (e.g., embedded into a master controller, embedded into a light fixture) with the power line communication in an existing electrical infrastructure decreases the installation cost of technology, thereby increasing the effective uses of the technology. Another advantage of the technology is that the use of the master controller with the power line communication increases the user's flexibility for configuring non-lighting elements, such as speakers, alarms, motors, and cameras, while reducing the installation cost (e.g., reduced cable cost, reduced labor cost), thereby increasing the effective uses of the technology (e.g., use in retrofits of existing buildings, use in remodels of existing buildings, use in new construction).

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
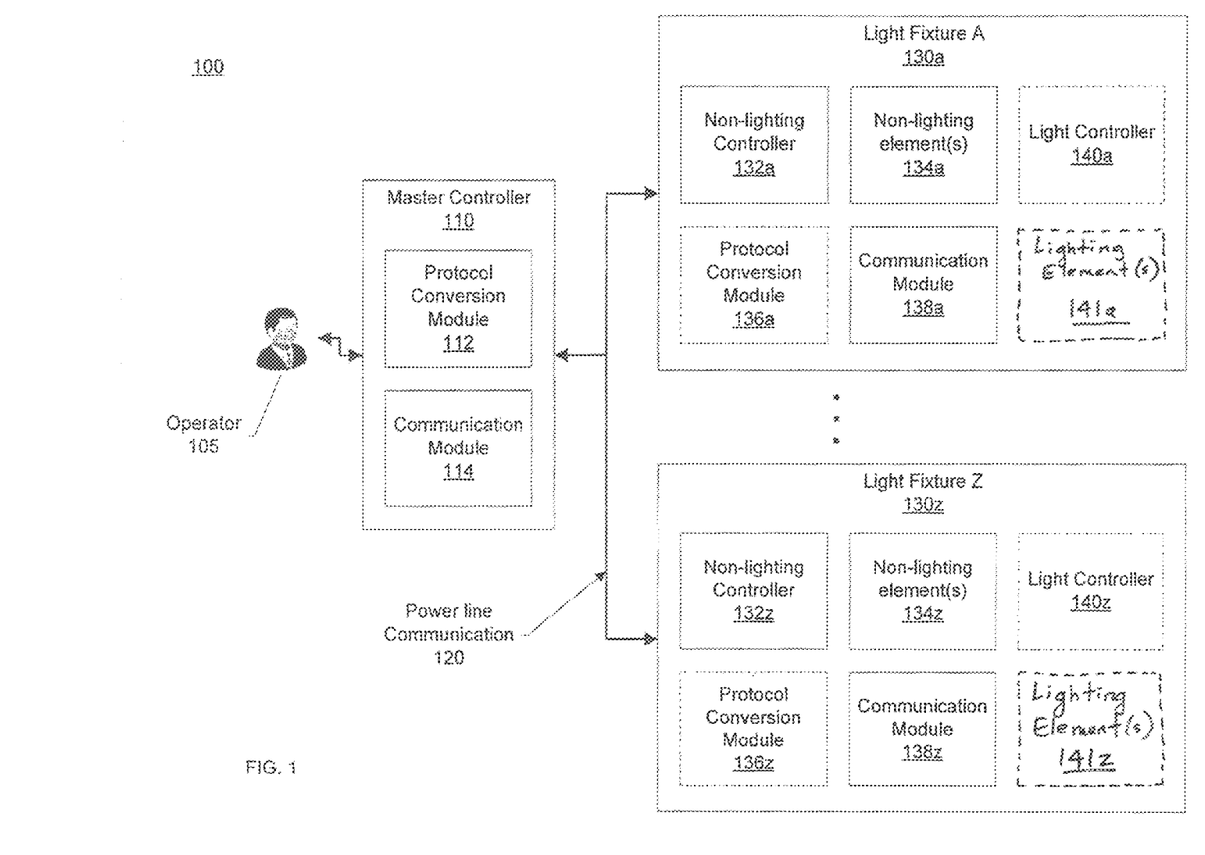
FIG. 1 is a block diagram of an example non-lighting application environment.

FIG. 1 is a block diagram of an example lighting environment 100. The environment 100 includes a master controller 110 and a plurality of light fixtures A 130*a* through Z 130*z*. The master controller 110 is operated by an operator 105 (e.g., adjust speaker controls, focus light). The master controller 110 includes a protocol conversion module 112 and a communication module 114. Each of the light fixtures A 130*a* through Z 130*z* includes a non-lighting controller 132*a* through 132*z*, non-lighting element 134*a* through 134*z* (such as speaker, alarm, motor or camera), an optional conversion module 136*a* through 136*z*, a communication module 138*a* through 138*z*. The master controller 110 communicates with the plurality of light fixtures A 130*a* through Z 130*z* via power line communication (PLC). PLC is a protocol. The operator 105 can adjust the master controller 110 (e.g., adjust a knob, slide a control).

The master controller 110 can receive a non-lighting control communication from an input device (not shown) (e.g., a computing device with non-lighting application controller, a computing device with an automated non-lighting application program, a slider, a knob). The protocol conversion module 112 converts the non-lighting control communication to a power line communication 120. The communication module 114 communicates the power line communication 120 to one or more of the light fixtures A 130*a* through Z 130*z*.

The communication module 138*a* through 138*z* of the respective light fixture A 130*a* through Z 130*z* receives the power line communication 120. In some examples, the respective conversion module 136*a* through 136*z* converts the power line communication 120 to a non-lighting control communication. The respective non-lighting controller 132*a* through 132*z* controls the respective non-lighting element 134*a* through 134*z* based on the non-lighting control communication (e.g., change the audio communication being played by a speaker in the light fixture, rotate the light fixture, start recording video). The conversion of the non-lighting control communication to power line communication advantageously decreases the installation cost of a public announcement system, alarm system, lighting system, surveillance system, and other non-lighting application systems by decreasing the cost to install and maintain wires (besides the wires providing power) between the controlling device (in this example, the master controller) and the non-lighting elements in the light fixtures.

In operation, the master controller 110 converts (e.g., embeds the instructions in power line communication, extracts the instructions from the non-lighting control communication and generates a power line communication) the non-lighting control communication to power line communication 120. The conversion of the non-lighting control communication into power line communication and vice versa (power line communication into non-lighting control communication) advantageously enables the integration of control of non-lighting elements in light fixtures, such as speakers, alarms, motors, and cameras, into existing power line control infrastructure, thereby reducing the maintenance and control costs for a public announcement system, for example.

The conversion of the non-lighting control communication into power line communication and vice versa advantageously increases the flexibility of a non-lighting application system by enabling control of non-lighting elements in light fixtures using existing power line control infrastructure. The master controller 110, via the communication module 114, communicates the power line communication 120 (e.g., amplitude modulation, digital power line carrier, pulse-position modulation) to the light fixtures A 130a through Z 130z.

In other examples, the conversion between non-lighting control communication and power line communication can include identification of the instructions within the non-lighting control communication, identification of the addresses for the non-lighting element and/or associated light fixtures being controlled by the instructions within the non-lighting control communication, and generation of the power line communication based on the instructions, addresses, and/or protocol information associated with the power line communication (e.g., amplitude format, quality control requirements). In some examples, the conversation between non-lighting control communication and power line communication further includes receiving a plurality of non-lighting control packets and determining when the instructions for particular non-lighting elements are complete (e.g., all of the non-lighting element packets that include instructions have been received, enough of the non-lighting element packets have been received to generate the power line communication).

In some examples, the light fixtures A 130a through Z 130z communicate power line communication 120 to the master controller 110. The master controller 110 can convert the power line communication 120 to non-lighting control communication. The master controller 110 can display and/or provide feedback of the power line communication to the operator 105.

In other examples, the conversion between power line communication and non-lighting control communication can include identification of the instructions within the power line communication, identification of the addresses for the non-lighting element and/or associated light fixtures being controlled by the instructions within the power line communication, and generation of the non-lighting control communication based on the instructions, addresses, and/or protocol information associated with the non-lighting element communication (e.g., packet format, quality control requirements). In other examples, the conversation between power line communication and non-lighting control communication further includes receiving a plurality of power line packets and determining when the instructions for non-lighting element are complete (e.g., all of the power line packets that include instructions have been received, enough of the power line packets have been received to generate the non-lighting control communication).

In other examples, the light fixtures A 130a through Z 130z and/or individual non-lighting elements 134a through 134z (and/or associated light fixtures A 130a through Z 130z) are individually addressable for control of the non-lighting elements. The individual control of one or more of the non-lighting elements advantageously enables the operator 105 and/or the master controller 110 to control a subset of the non-lighting elements. In some examples, the master controller 110 transmits the power line communication 120 to a non-lighting element 134 in the one or more light fixtures A 130a through Z 130z based on an address associated with the non-lighting element 134. In other words, the individualized addressing of the non-lighting element 134 enables the master controller 110 to focus control activities on the non-lighting element that are being controlled by the instructions.

In some examples, the instructions to control the one or more non-lighting elements include one or more addresses for individual non-lighting elements in the one or more light fixtures. The master controller 110 can include the addresses for the individual non-lighting elements in the power line communication 120. In other words, the power line communication 120 can include individual addresses for a subset of the non-lighting elements (in this example, individual non-lighting elements) for individualized control of the particular non-lighting elements (e.g., reduce the volume of half of the speakers and increase the volume of the other half).

In other examples, the non-lighting control communication can be embedded into any type of network protocol (e.g., wireless local area network (WLAN or WiFi), transmission control protocol (TCP)/internet protocol (IP)). In this example, the wireless light controller converts the TCP/IP non-lighting control communication into a carrier wave modulation power line communication. Table 1 illustrates example conversions between non-lighting control communication and power line communication.

TABLE 1

Example Conversion

| Non-lighting Control Communication Instruction | Non-lighting Control Communication Type | Power Line Communication Instruction | Power Line Communication Type |
|---|---|---|---|
| select/play class bell | three non-lighting control packets | select/play class bell | pulse-position modulation |
| increase alarm | single non-lighting | increase alarm | distribution line |

TABLE 1-continued

Example Conversion

| Non-lighting Control Communication Instruction | Non-lighting Control Communication Type | Power Line Communication Instruction | Power Line Communication Type |
|---|---|---|---|
| volume to 50% intensity | control packet | volume to 50% intensity | carrier |
| change focus of lights; rotate lights start/stop recording video; pan left/right; zoom in/out; return home | ten non-lighting control packets single non-lighting control packet | change focus of lights; rotate lights start/stop recording video; pan left/right; zoom in/out; return home | amplitude modulation pulse modulation |

In some examples, the respective conversion module 136a through 136z also converts the power line communication 120 to a lighting control communication. Example lighting control communication includes remote device management (RDM), digital multiplex with 512 pieces of information (DMX512), Digital Addressable Lighting Interface (DALI), and ZigBee. In other examples, each of the light fixtures A 130a through Z 130z includes a light controller 140a through 140z. The respective light controller 140a through 140z controls a respective lighting element 141a through 141z, for example, one or more light-emitting diodes (LEDs) or sets of LEDs, based on the lighting control communication, (e.g., change the intensity of a LED, turn on a set of LEDs). The conversion of the lighting control communication to power line communication advantageously decreases the installation cost of a light control system by decreasing the cost to install and maintain wires (besides the wires providing power) between the controlling device (in this example, the master controller) and the light fixtures.

In other examples, the protocol conversion module 112 of the master controller 110 identifies the instructions in the remote device communication. The protocol conversion module 112 imprints the identified instructions (e.g., select/play class bell, increase alarm volume to 50% intensity) onto the power line communication. In some examples the protocol conversion module 112 encapsulates the identified instructions in the power line communication. Table 2 illustrates example instructions and encapsulation of the instructions.

TABLE 2

Example Encapsulation

| Non-lighting Control Communication Instruction | Non-lighting Control Communication | Power Line Communication Instruction | Power Line Communication |
|---|---|---|---|
| select class bell | non-lighting control header; non-lighting control instruction | select class bell | plc header; non-lighting control instruction |
| increase alarm volume to 50% intensity | non-lighting control header; non-lighting control instruction | increase alarm volume to 50% intensity | plc header; non-lighting control instruction |
| change focus of lights; rotate lights | non-lighting control header; other non-lighting control data; non-lighting control instruction | change focus of lights; rotate lights | plc header; non-lighting control instruction |
| start/stop recording video; pan left/right; zoom in/out; return home | non-lighting control header; non-lighting control instruction; other non-lighting control data | start/stop recording video; pan left/right; zoom in/out; return home | plc header; non-lighting control instruction |

Although FIG. 1 illustrates the operator 105 utilizing the master controller 110 to control the non-lighting elements, the master controller 110 can control the non-lighting elements based on any type of automated control techniques. For example, the master controller 110 can include a sensor (e.g., light or motion sensor) and can control the non-lighting element based on the detection by the sensor. As another example, the master controller 110 can include a time schedule program and can control the non-lighting elements based on the time schedule program (e.g., turn a speaker on at a certain time, turn an alarm to 50% intensity based on pre-determined conditions).

Figure 2A:
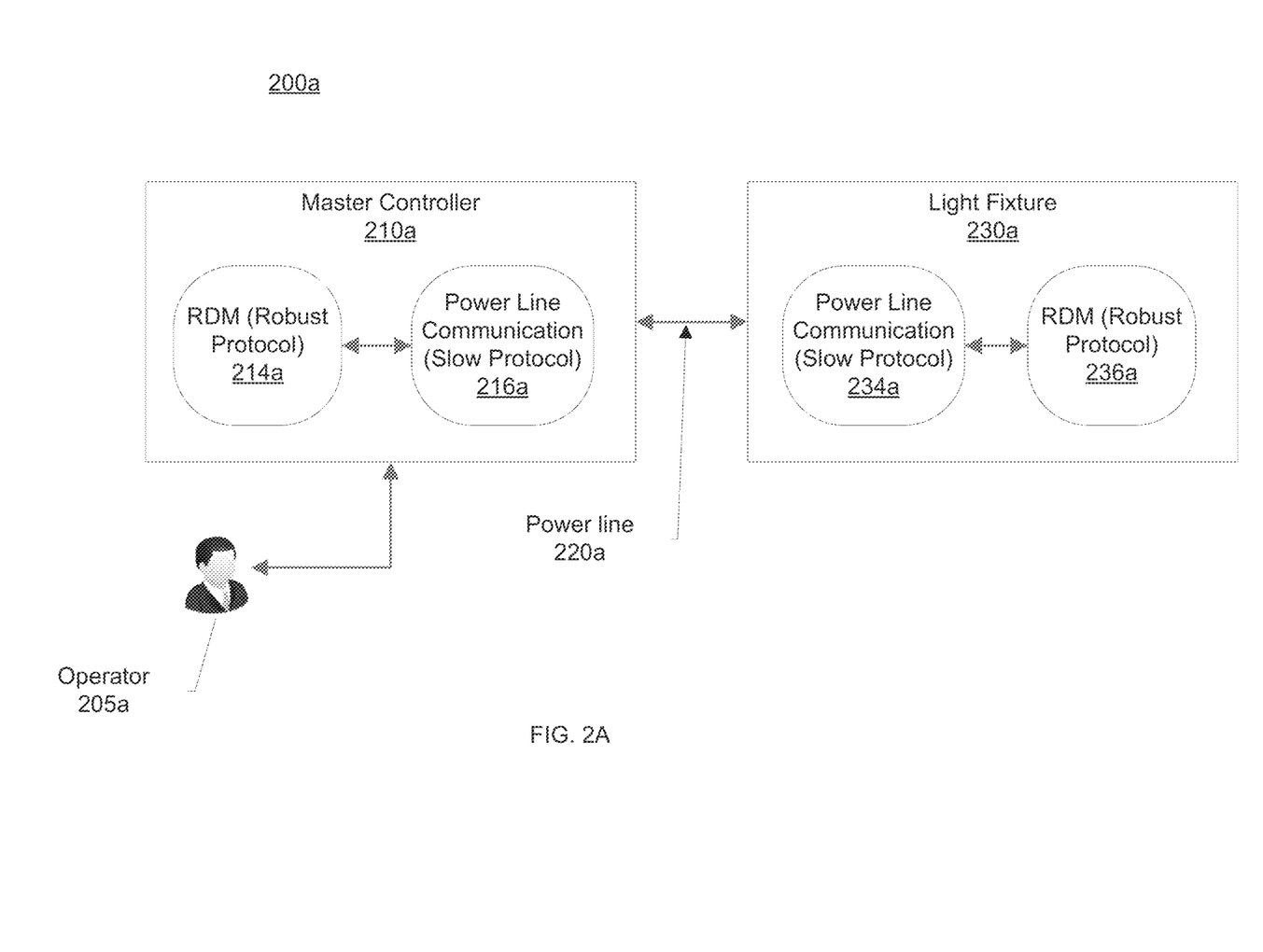
FIGS. 2A-2C are block diagrams of example non-lighting application environments.

FIG. 2A is a block diagram of another example non-lighting application environment 200a. The environment 200a includes a master controller 210a and a light fixture 230a. An operator 205a can modify a setting of a non-lighting element associated with the light fixture 230a using the master controller 210a (e.g., speaker volume, alarm duration, light fixture position, camera pan/tilt). The master controller 210a generates the non-lighting control communication 214a (e.g., generated based on the operator's modification of a setting) to control the non-lighting element in the light fixture 230a based on input from the operator 205a (e.g., moving a switch, change a setting on a graphical user interface). The master controller 210a converts the non-lighting control communication 214a to a power line communication 216a. The master controller 210a transmits the power line communication 216a to the light fixture 230a via a power line 220a. The light fixture 230a receives the power line communication 234a and converts the power line communication 234a to a non-lighting control communication 236a. The light fixture 230a controls the associated non-lighting element based on the non-lighting control 236a.

In this example, the non-lighting control communication 214a and 236a are a robust protocol (e.g., high bandwidth, high bandwidth quality control) and the power line communication 216a and 234a is a slow protocol (e.g., 570 kilobits per second, 200 kilobits per second). In other words, the master controller 210a converts an inherently robust protocol with particular types of quality control characteristics (e.g., error control, transmission control, active acknowledgment of receipt) to an inherently slow protocol with limited quality control characteristics (e.g., multiple re-sends to avoid lost packets, passive acknowledge of receipt). The technology can advantageously handle both types of quality control characteristics (i.e., the quality control characteristics of the non-lighting control communication and the quality control characteristics of the power line communication), thereby reducing communication losses associated with non-lighting control communication (e.g., packet collisions, redundant instructions) and power line communication (e.g., electrical interference, magnetic interference). The master controller 210a can remove the quality control characteristics and/or insert other types of quality control characteristics to the power line communication. The conversion between a robust protocol and a slow protocol advantageously enables the technology to utilize existing technology (e.g., power lines, light systems) with high fidelity control techniques (e.g., individual control of non-lighting elements, control features).

In some examples, the communication size can be minimized for the power line communication 216a and 234a to reduce the transmission time via the power line 220a. Table 3 illustrates example communication size of the communication. Although FIG. 2A and Table 3 illustrate the power line communication 216a and 234a as two parts of the diagram, the power line communication 216a and 234a can be the same communication transmitted via the power line 220a. In some examples, the power line communication 216a and 234a are different due external causes (e.g., transmission interference, repeater addition).

TABLE 3

Example Communication Size

| Non-lighting Control Communication 214a | Power Line Communication 216a | Power Line Communication 234a | Non-Lighting Control Communication 236a |
| --- | --- | --- | --- |
| 4 packets | 1 packet | 1 packet | 3 packets |
| 24 bytes | 4 bytes | 4 bytes | 24 bytes |
| 24 bytes | 4 bytes | 4 bytes | 20 bytes |
| 300 packets | 2 bytes | 2 bytes | 1 packet |

Figure 2B:
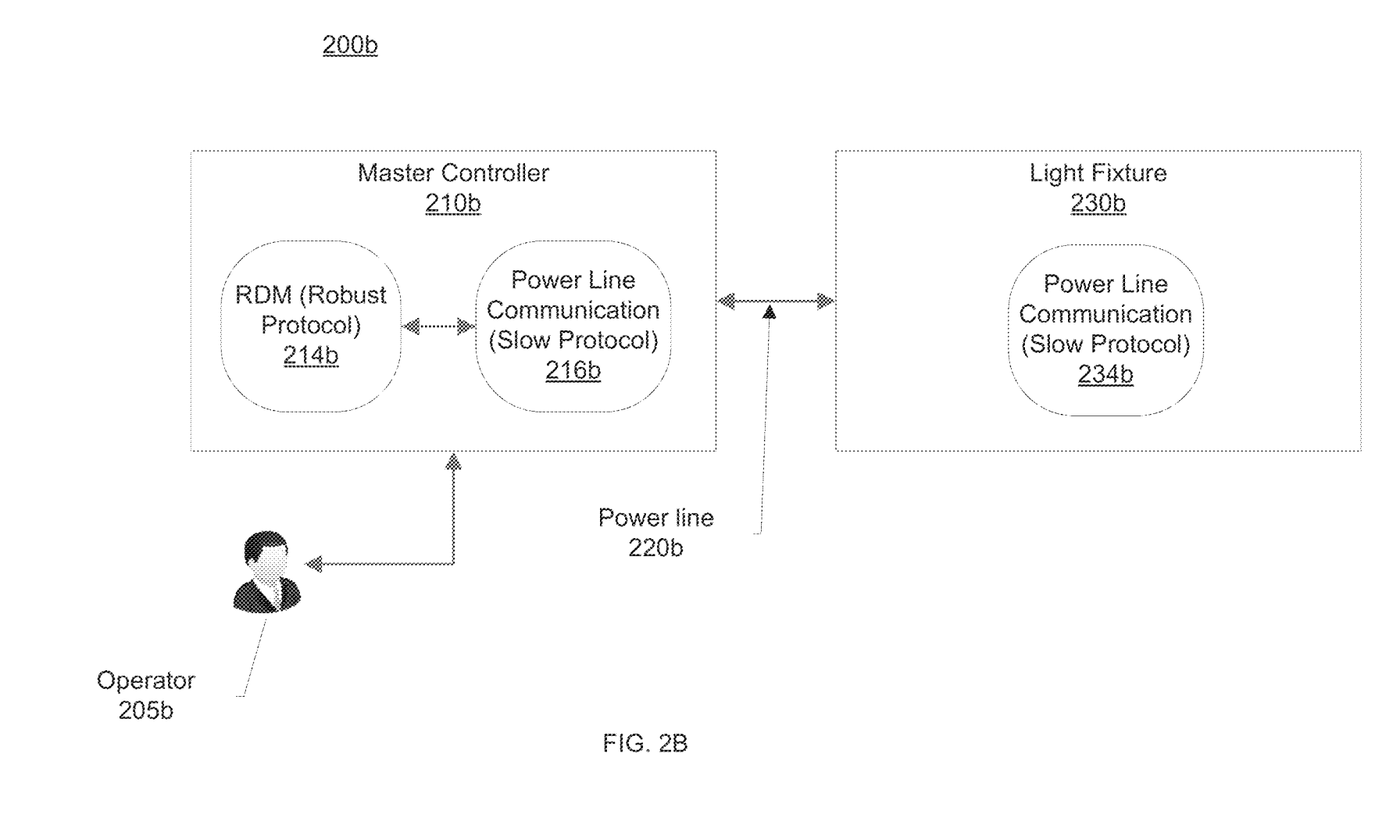

FIG. 2B is a block diagram of another example non-lighting application environment 200b. The environment 200b includes a master controller 210b and a light fixture 230b. An operator 205b can modify a setting of a non-lighting element associated with the light fixture 230b using the master controller 210b (e.g., speaker volume, alarm duration, light fixture position, camera pan/tilt). The master controller 210b generates the non-lighting control communication 214b (e.g., generated based on the operator's modification of a setting) to control the non-lighting element of the light fixture 230b responsive to input from the operator 205b (e.g., moving a switch, change a setting on a graphical user interface). The master controller 210b converts the non-lighting control communication 214b to a power line communication 216b. The master controller 210b transmits the power line communication 216b to the light fixture 230b via the power line 220b. The light fixture 230a receives the power line communication 234b and controls the associated non-lighting element based on the power line communication 236b.

In some examples, the communication size can be minimized for the power line communication 216b and 234b to reduce the transmission time via the power line 220b. Table 4 illustrates example communication size of the communication. Although FIG. 2B and Table 4 illustrate the power line communication 216b and 234b as two parts of the diagram, the power line communication 216b and 234b can be the same communication transmitted via the power line 220b. In some examples, the power line communication 216b and 234b are different due to external causes (e.g., transmission interference, repeater addition).

TABLE 4

Example Communication Size

| Non-lighting Control Communication 214b | Power Line Communication 216b | Power Line Communication 234b |
| --- | --- | --- |
| 6 packets | 1 packet | 1 packet |
| 20 bytes | 4 bytes | 4 bytes |
| 16 bytes | 4 bytes | 4 bytes |
| 100 packets | 2 bytes | 2 bytes |

Figure 2C:
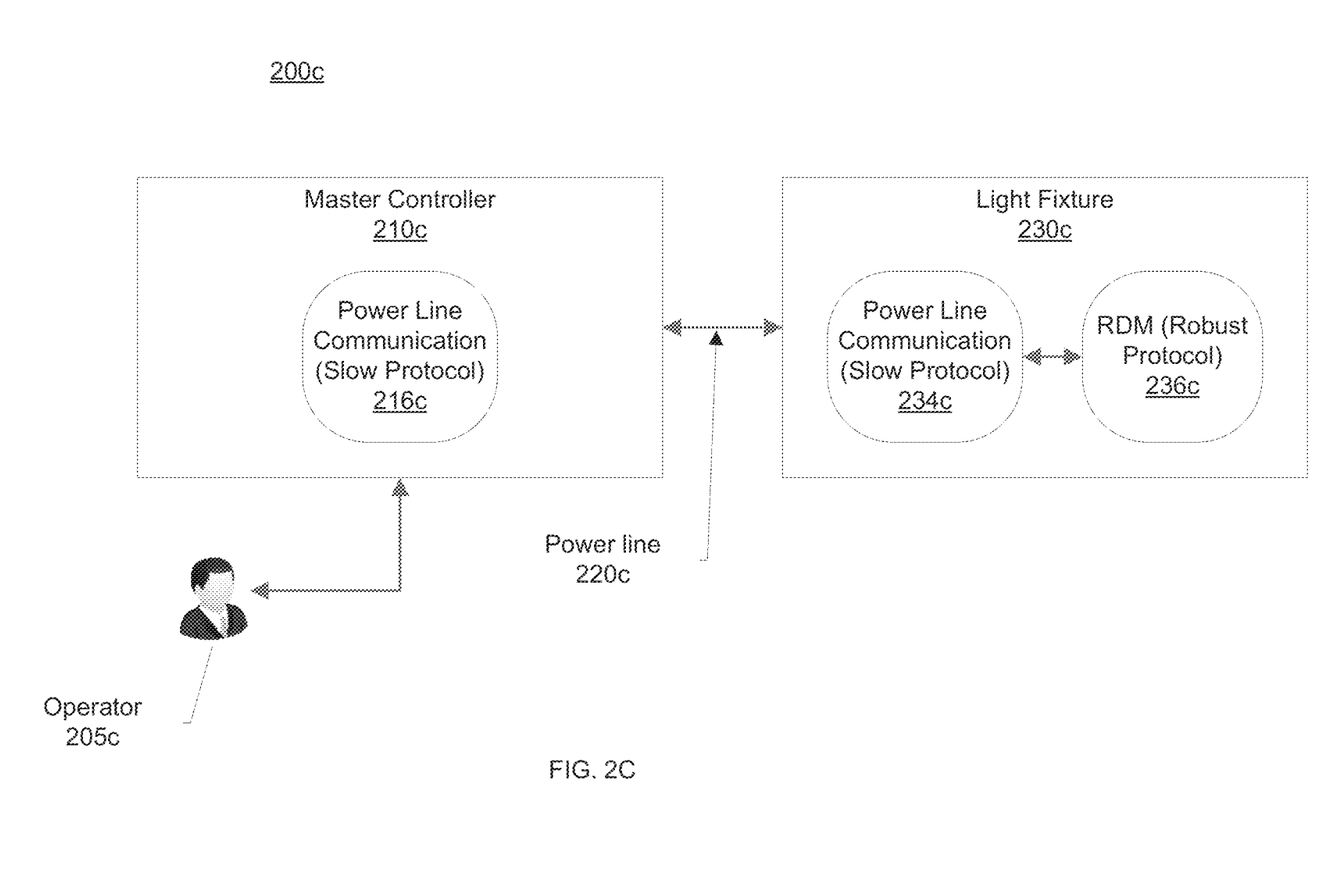

FIG. 2C is a block diagram of another example non-lighting application environment 200c. The environment 200c includes a master controller 210c and a light fixture 230c. An operator 205c can modify a setting of a non-lighting element associated with the light fixture 230c using the master controller 210c (e.g., speaker volume, alarm duration, light fixture position, camera pan/tilt). The master controller 210c generates the power line communication 216c (e.g., generated based on the operator's modification of a setting) to control the light fixture 230c based on input from the operator 205c (e.g., moving a switch, change a setting on a graphical user interface). The master controller 210c transmits the power line communication 216c to the light fixture 230c via the power line 220c. The light fixture 230c receives the power line communication 234c and converts the power line communication 234c to a non-lighting control communication 236c. The light fixture 230c controls the associated non-lighting element based on the non-lighting control communication 236c.

In some examples, the communication size can be minimized for the power line communication 216c and 234c to reduce the transmission time via the power line 220c. Table 5 illustrates example communication size of the communication. Although FIG. 2C and Table 5 illustrate the power line communication 216c and 234c as two parts of the diagram, the power line communication 216c and 234c can be the same communication transmitted via the power line 220c. In some examples, the power line communication 216c and 23c are different due external causes (e.g., transmission interference, repeater addition).

TABLE 5

Example Communication Size

| Power Line Communication 216c | Power Line Communication 234c | Non-lighting Control Communication 236c |
|---|---|---|
| 1 packet | 1 packet | 3 packets |
| 4 bytes | 4 bytes | 24 bytes |
| 4 bytes | 4 bytes | 20 bytes |
| 2 bytes | 2 bytes | 1 packet |

Figure 3:
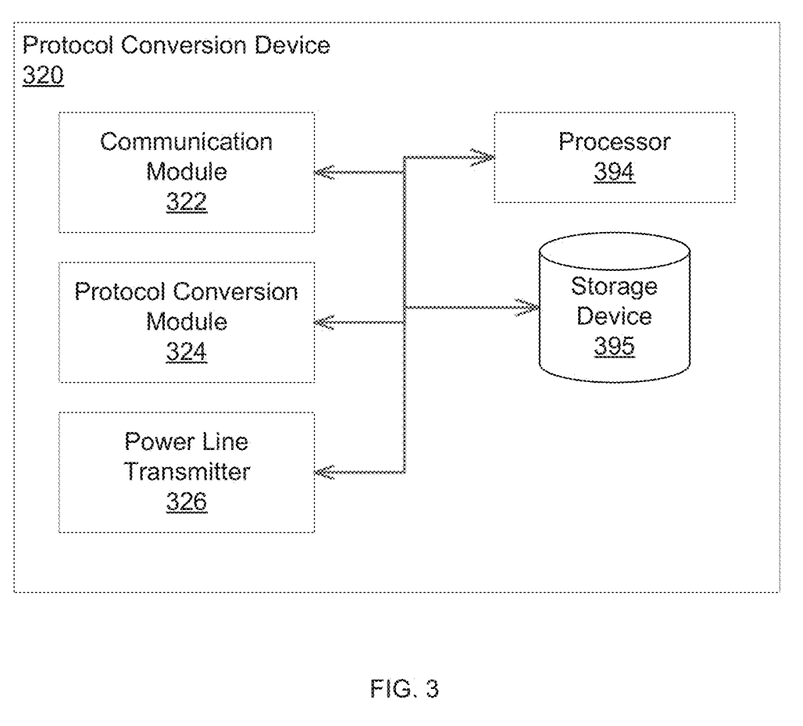
FIG. 3. is a block diagram of an example protocol conversion device.

FIG. 3 is a block diagram of an example protocol conversion device 320. The protocol conversion device 320 can be utilized and/or embedded into a master controller and/or a light fixture. The protocol conversion device 320 includes a communication module 322, a protocol conversion module 324, a power line transmitter 326, a processor 394, and a storage device 395. The modules and devices described herein can, for example, utilize the processor 394 to execute computer executable instructions and/or the modules and devices described herein can, for example, include their own processor to execute computer executable instructions (e.g., a protocol processing unit, a field programmable gate array processing unit). It should be understood the protocol conversion device 320 can include, for example, other modules, devices, and/or processors known in the art and/or varieties of the illustrated modules, devices, and/or processors.

The communication module 322 receives a non-lighting control communication. The non-lighting control communication includes one or more instructions to control one or more non-lighting elements in a light fixture (e.g., increase/decrease speaker volume, turn on/off individual alarms, rotate light fixture, pan/tilt camera), status monitoring information (e.g., speaker at 50% maximum volume, camera is recording video), and/or energy management information (e.g., camera is in sleep mode).

In other examples, the communication module 322 receives a lighting control communication like remote device management (RDM), digital multiplex with 512 pieces of information (DMX512), Digital Addressable Lighting Interface (DALI), and ZigBee. The lighting control communication includes one or more instructions to control one or more associated LEDs (e.g., turn off individual LEDs, change intensity of light fixture), status monitoring information (e.g., LEDs operating at 50% output, temperature of light fixture components), and/or energy management information (e.g., ambient light at 25% and LEDs output at 75%, energy usage of light fixture).

In some examples, the protocol conversion module 324 identifies the one or more instructions to control the one or more non-lighting elements, the status monitoring information, and/or the energy management information in the non-lighting control communication; identifies one or more recipients of the non-lighting control communication; and generates the power line communication based on the identified one or more recipients and the identified one or more instructions to control the one or more light fixtures, the identified status monitoring information, and/or the identified energy management information. In other words, the protocol conversion module 324 identifies duplicative information to reduce the PLC size, thereby increasing the efficiency of the power line communication between the master controller and light fixtures.

The power line transmitter 326 transmits the power line communication via the power line. The processor 394 executes the operating system and/or any other computer executable instructions for the protocol conversion device 320 (e.g., executes applications). Memory in the system, modules or components can include code representing instructions that when executed cause one or more processors to perform the method steps described herein. The storage device 395 stores non-lighting element information and/or control information (e.g., non-lighting element serial number, light fixture address, light fixture usage). The storage device 395 can include a plurality of storage devices and/or the protocol conversion device 320 can include a plurality of storage devices (e.g., a protocol storage device, an instruction storage device). The storage device 395 can include, for example, long-term storage (e.g., a hard drive, a tape storage device, flash memory), short-term storage (e.g., a random access memory, a graphics memory), and/or any other type of computer readable storage.

Figure 4:
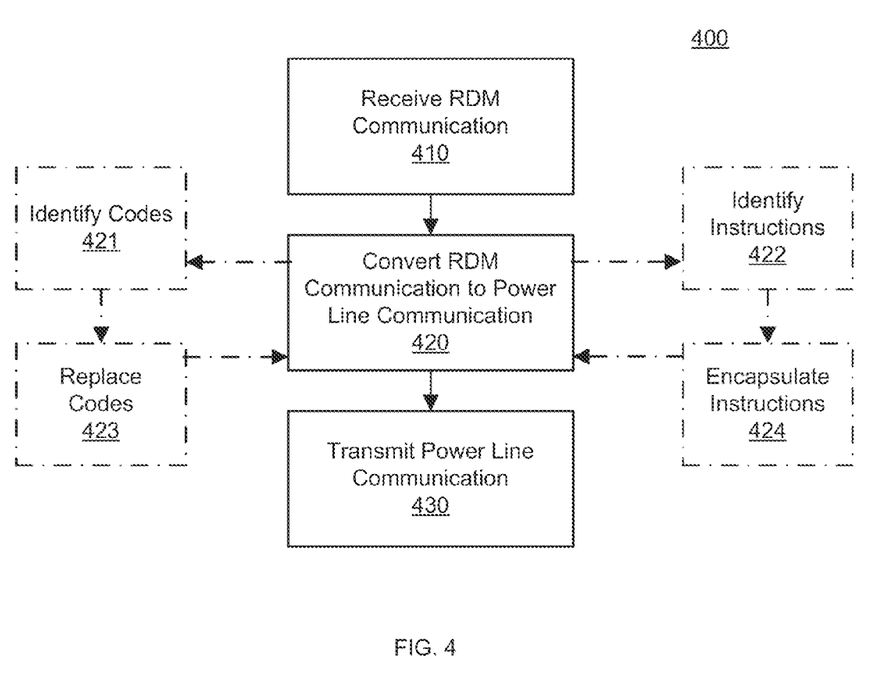
FIG. 4 is a process diagram of an example power line non-lighting application controller method.

FIG. 4 is a process diagram of an example protocol conversion method 400 utilizing, for example, the protocol conversion device 320 of FIG. 3. The communication module 322 receives (410) a non-lighting control communication. The non-lighting control communication includes one or more instructions associated with one or more light fixtures. The protocol conversion module 324 converts (420) the non-lighting control communication to a power line communication. The power line transmitter 326 transmits (430) the power line communication to the one or more light fixtures via the power line.

In some examples, the communication module 322 receives (410) the non-lighting control communication from a controller operated by a user (e.g., controller electrically connected to the protocol conversion device 320, controller embedded into the protocol conversion device 320) and the one or more instructions control the one or more light fixtures. In other examples, the communication module 322 receives (410) the non-lighting control communication from the one or more light fixtures and the one or more instructions include non-lighting element information for the one or more light fixtures.

In some examples, the protocol conversion module 324 identifies (422) the one or more instructions to control the one or more light fixtures in the non-lighting control communication. The protocol conversion module 324 imprints (424) the one or more instructions onto the power line communication. The one or more instructions are a smaller byte size than the non-lighting control communication (e.g., non-lighting control communication is ten bytes and the instructions are one byte, non-lighting control communication is twenty bytes and the instructions are two bytes), which advantageously decreases the size of the power line communication and decreases the time to transmit the power line communication via the power line.

Figure 5:
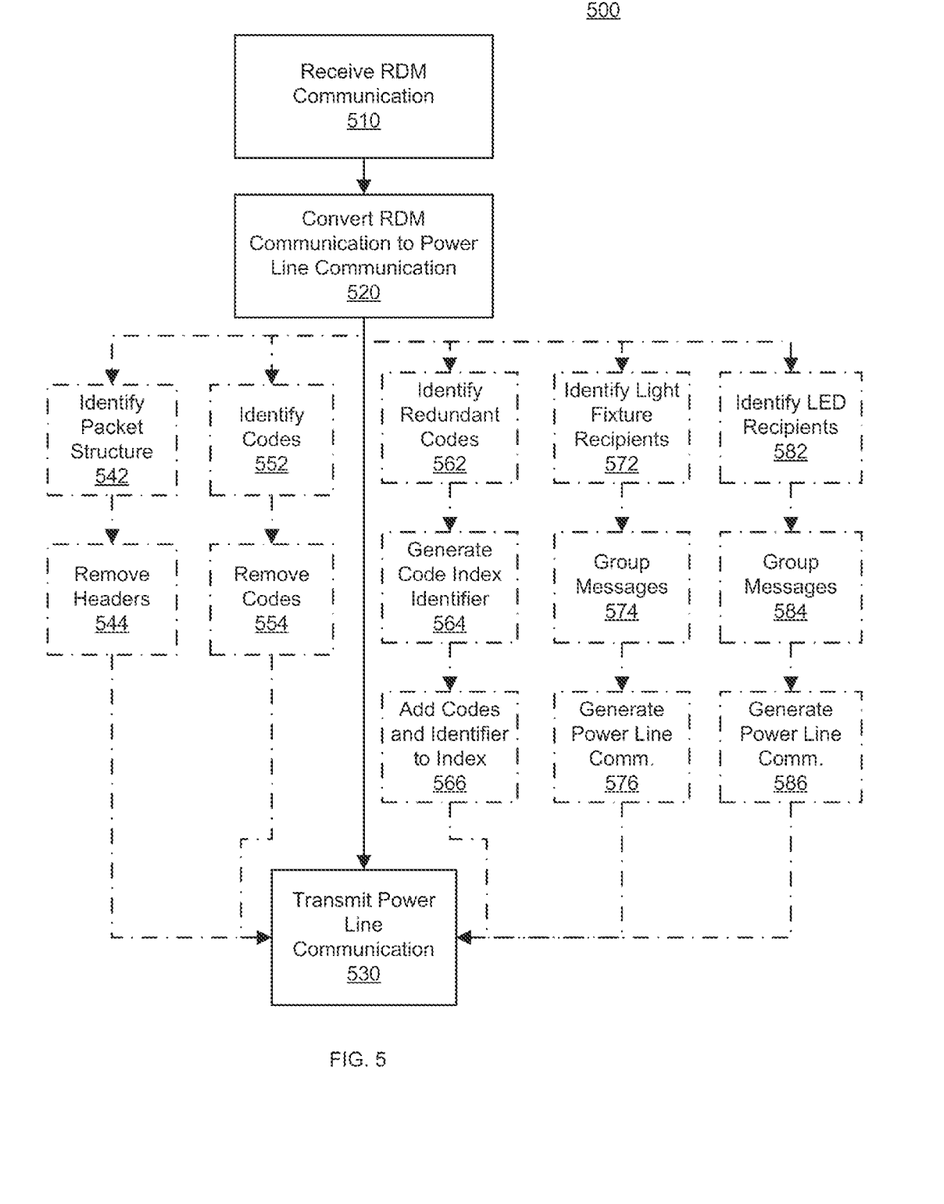
FIG. 5 is a flowchart of another example power line non-lighting application controller method.

FIG. 5 is a process diagram of an example protocol conversion method 500 utilizing, for example, the protocol conversion device 320 of FIG. 3. The communication module 322 receives (510) a non-lighting control communication. The non-lighting control communication includes one or more instructions associated with one or more non-lighting elements in a light fixture. The protocol conversion module 324 converts (520) the non-lighting control communication to a power line communication. The power line transmitter 326 transmits (530) the power line communication to the light fixture via the power line.

In other examples, the non-lighting control communication includes a plurality of non-lighting control messages. The protocol conversion module 324 identifies (572) one or more light non-lighting element recipients of the plurality of non-lighting control messages. The protocol conversion module 324 groups (574) the plurality of non-lighting control messages into one or more sub-sets of non-lighting control messages based on the identification of the one or more non-lighting element recipients of the plurality of non-lighting control messages. The protocol conversion module 324 generates (576) the power line communication based on the one or more sub-sets of non-lighting control messages. Table 6 illustrates example recipient grouping.

TABLE 6

Example Recipient Grouping

| Non-lighting Control Communication Instruction | Non-lighting Control Communication Recipient | Power Line Communication Instruction | Power Line Communication Recipients |
|---|---|---|---|
| Set speaker volume to 50% of maximum | Speaker A in light fixture A | Set speaker volume to 50% of maximum | Speaker A in light fixture A and speaker B in light fixture B |
| Set speaker volume to 50% of maximum | Speaker B in light fixture B | | |
| Change position of light fixture | Light fixture D | Change position of light fixture | Light fixtures D and E |
| Change position of light fixture | Light fixture E | | |

In some examples, a lighting control communication includes a plurality of lighting control messages and each light fixture of the one or more light fixtures includes one or more light emitting diodes (LEDs). The protocol conversion module 324 identifies (582) one or more LEDs recipients of the plurality of lighting control messages. The protocol conversion module 324 groups (584) the plurality of lighting control messages into one or more sub-sets of lighting control messages based on the identification of the one or more LEDs recipients of the plurality of lighting control messages. The protocol conversion module 324 generates (586) the power line communication based on the one or more sub-sets of lighting control messages.

In some examples, any of the processes described herein (572, 574, 576, 582, 584, and/or 586) can be processed sequentially and/or in parallel. Table 7 illustrates example non-lighting element recipient and LED recipient grouping.

TABLE 7

Example non-lighting element recipient and LED recipient grouping

| Non-Lighting Control Communication Instruction | Lighting Control Communication Instruction | Non-lighting/ Lighting Control Communication Recipient | Power Line Communication Instruction | Power Line Communication Recipients |
|---|---|---|---|---|
| Set speaker volume to 50% of maximum | Turn lights to 30% intensity | Light fixture A | Set speaker volume to 50% of maximum and turn lights to 30% intensity | Light fixtures A and B |
| Set speaker volume to 50% of maximum | Turn lights to 30% intensity | Light fixture B | | |
| Rotate lights 30 degrees to the left | Turn lights to 50% intensity | Light fixture D | Rotate lights 30 degrees to the left and turn lights to 50% intensity | Light fixtures D and E |
| Rotate lights 30 degrees to the left | Turn lights to 50% intensity | Light fixture E | | |

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A non-lighting application controller system, comprising:
    a light fixture electrically coupled to a power line, the light fixture comprising:
        a conversion module configured to convert instructions for a non-lighting element between power line communication and non-lighting control communication, the conversion module being further configured to identify the instructions for the non-lighting element in the non-lighting control communication, to determine when the instructions for the non-lighting element are complete, and to encapsulate the identified instructions for the non-lighting element in the power line communication, the encapsulating including imprinting the identified instructions for the non-lighting element onto the power line communication, the imprinted instructions being of a first data size comprising a first quantity of bytes, the non-lighting control communication being of a second data size comprising a second quantity of bytes larger than the first quantity of bytes, the power line communication being carried out at a bit rate which is independent of the first quantity of bytes,
        a communication module configured to receive the power line communication over the power line, and
        a non-lighting element controller configured to control a non-lighting element in the light fixture based on the instructions for the non-lighting element; and
    a master controller comprising a communication module configured to communicate the power line communication over the power line.

2. The non-lighting application controller system of claim 1, wherein the non-lighting element in the light fixture is at least one of a speaker, an alarm, a motor, and a camera.

3. The non-lighting application controller system of claim 1, wherein the communication module of the light fixture is further configured to transmit a power line communication over the power line acknowledging at least one of: receipt of the instructions and execution of the instructions.

4. The non-lighting application controller system of claim 1, wherein the light fixture further comprises a lighting controller configured to control a light emitting diode (LED) in the light fixture based on light instructions; and wherein the conversion module of the light fixture is further configured to convert the light instructions between power line communication and lighting control communication.

5. The non-lighting application controller system of claim 1, wherein the master controller further comprises a conversion module configured to convert the instructions between the power line communication and non-lighting control communication.

6. The non-lighting application controller system of claim 5, wherein the conversion module of the master controller is further configured to convert light instructions between power line communication and lighting control communication; and wherein the light fixture further comprises a lighting controller configured to control a light emitting diode (LED) in the light fixture based on the light instructions.

7. The non-lighting application controller system of claim 6, wherein the lighting control communication is at least one of RDM, DMX remote device management (RDM), digital multiplex with 512 pieces of information (DMX512), Digital Addressable Lighting Interface (DALI), and ZigBee.

8. A non-lighting application controller method, comprising:
    receiving a non-lighting control communication, the non-lighting control communication including one or more instructions associated with a non-lighting element in a light fixture;
    converting the non-lighting control communication to a power line communication, the converting comprising identifying the instructions associated with the non-lighting element in the non-lighting control communication, determining when the instructions associated with the non-lighting element are complete, and encapsulating the identified instructions associated with the non-lighting element in the power line communication, the encapsulating comprising imprinting the identified instructions associated with the non-lighting element onto the power line communication, the imprinted instructions being of a first data size comprising a first quantity of bytes, the non-lighting control communication being of a second data size comprising a second quantity of bytes larger than the first quantity of bytes, the power line communication being carried out at a bit rate which is independent of the first quantity of bytes; and
    transmitting the power line communication to the light fixture via the power line.

9. The non-lighting application controller method of claim 8, wherein the non-lighting element in the light fixture is at least one of a speaker, an alarm, a motor, and a camera.

10. The non-lighting application controller method of claim 8, wherein the non-lighting control communication is received from a controller operated by a user and the one or more instructions control the non-lighting element in the light fixture.

11. The non-lighting application controller method of claim 8, wherein the non-lighting control communication is received from the light fixture and the one or more instructions includes information for the non-lighting element in the light fixture.

12. The non-lighting application controller method of claim 8, wherein the non-lighting control communication comprises a plurality of non-lighting control messages and the method further comprising:
    identifying one or more non-lighting element recipients of the plurality of non-lighting control messages;
    grouping the plurality of non-lighting control messages into one or more sub-sets of non-lighting control messages based on the identification of the one or more non-lighting element recipients of the plurality of non-lighting control messages; and
    generating the power line communication based on the one or more sub-sets of non-lighting control messages.

13. The non-lighting application controller method of claim 8, further comprising:

receiving a light control communication, the light control communication including one or more light instructions associated with a light emitting diode (LED) in a light fixture and light control communication received from at least one of a controller operated by a user and the light fixture;

converting the light control communication to the power line communication; and transmitting the power line communication to the light fixture via the power line.

14. A protocol conversion device, comprising:
a communication module configured to receive a non-lighting control communication, the non-lighting control communication including one or more instructions to control a non-lighting element in a light fixture;
a protocol conversion module configured to convert the non-lighting control communication to a power line communication, the protocol conversion module being further configured to identify the instructions to control the non-lighting element in the non-lighting control communication, to determine when the instructions to control the non-lighting element are complete, and to encapsulate the identified instructions to control the non-lighting element in the power line communication, the encapsulating including imprinting the identified instructions to control the non-lighting element onto the power line communication, the imprinted instructions being of a first data size comprising a first quantity of bytes, the non-lighting control communication being of a second data size comprising a second quantity of bytes larger than the first quantity of bytes, the power line communication being carried out at a bit rate which is independent of the first quantity of bytes; and
a power line transmitter configured to transmit the power line communication via the power line.

15. The protocol conversion device of claim 14, wherein the non-lighting element in the light fixture is at least one of a speaker, an alarm, a motor, and a camera.

16. The protocol conversion device of claim 14, wherein the protocol conversion module is further configured to:
identify, in the non-lighting control communication, the one or more instructions to control the non-lighting element in the light fixture;
identify one or more non-lighting element recipients of the non-lighting control communication; and
generate the power line communication based on the identified one or more non-lighting element recipients and the identified one or more instructions to control the one or more non-lighting element in the light fixture.

17. The protocol conversion device of claim 14, wherein the communication module is configured to receive a light control communication, the light control communication includes one or more light instructions to control a light emitting diode (LED) in the light fixture; and wherein the protocol conversion module is further configured to convert the light control communication to the power line communication.

* * * * *